…

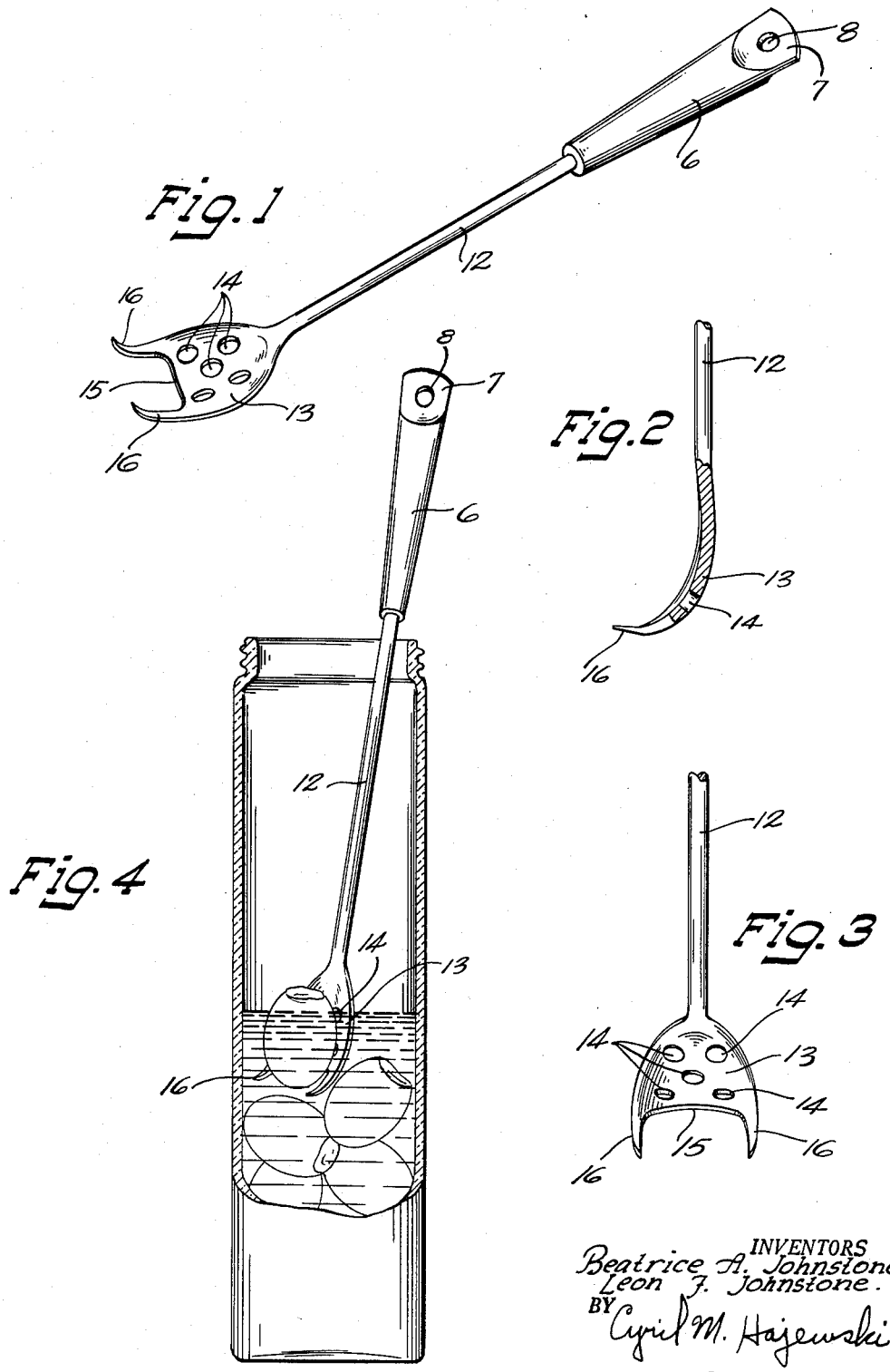

United States Patent Office 2,727,777
Patented Dec. 20, 1955

2,727,777

UTENSIL FOR REMOVING FOOD FROM CONTAINERS

Leon F. Johnstone and Beatrice A. Johnstone, Milwaukee, Wis.

Application December 23, 1954, Serial No. 477,311

3 Claims. (Cl. 294—26)

This invention relates generally to utensils for removing food from containers, and more particularly to an improved utensil for removing food items from deep containers having relatively narrow openings such as jars or the like.

The various utensils presently available for removing food from containers have been found to be inconvenient for use in many instances. They are particularly impractical for removing relishes and other foods which are immersed in a liquid contained in relatively deep containers having narrow openings. For example, the implements generally provided for removing olives, pickles, and the like from jars, consist of an elongated handle with a plurality of tines extending from one end for the purpose of piercing the food item to secure it and raise it from the jar. Piercing the food in this manner tends to mar it, detracting from its appearance. Furthermore, this method of grasping the food is not positive, and frequently it will accidentally fall from the tines before it is brought to the serving dish or receptacle in which it is to be placed. When this does not occur, the food must be manipulated to release it from the tines.

In those instances where the piercing of food is not practical, it has been the practice to employ spoons with elongated handles for reaching into the jar to remove the food. Such implements have the spoon portion substantially in alignment with the handle in the usual manner so that it is necessary to tilt the jar to enable the spoon to be held in a substantially horizontal position for receiving and retaining the food. In order to tilt the jar in this manner it is necessary to remove a portion of the liquid to avoid spilling it. If all of the food is not served immediately, some of it remaining in the jar may then not be covered by the liquid, and its spoilage will therefore be accelerated. For example, capers are pickled in a liquid and marketed in sealed jars. These are too small to be conveniently pierced by tines, and the entire jar is not usually consumed at one serving. For their preservation in the unsealed jar, it is desirable that those remaining be immersed in the pickling fluid. However, it is inconvenient to extract them from the jar with the ordinary spoon without removing an excessive amount of the liquid. For these reasons the implements presently available for removing these types of food from containers have been found to be not entirely satisfactory for general use.

It is therefore a general purpose of the present invention to provide an improved utensil for removing food from containers.

Another object of the present invention is to provide a utensil adapted to either pierce food or scoop it in a spoon portion or cradle for lifting it from its container.

Another object of the present invention is to provide a utensil which may be employed to remove food from deep containers without marring the food.

Another object is to provide an improved utensil presenting a spoon portion adapted to scoop food from deep containers without excessively inclining the containers.

Another object is to provide an improved utensil for removing food from deep containers which is especially adapted to maneuver tightly packed food into a spoon portion or cradle for lifting it from the container.

Another object is to provide an improved utensil having a spoon portion cooperating with tines to form a cradle for facilitating the removal of food from deep containers.

A further object is to provide an improved utensil especially adapted to individually remove from their containers a large variety of the various types of foods packaged in relatively deep containers with narrow openings.

A still further object is to provide an improved utensil for removing food from containers which is of simple and inexpensive construction but efficient and convenient in operation.

According to this invention the improved utensil for removing food from containers comprises essentially a handle having an elongated shank extending coaxially therefrom with a spoon portion formed integrally at the opposite end of the shank. The spoon portion presents the usual concave surface for receiving and retaining food, but this surface is provided with openings to permit the drainage of liquid so that the food item may be conveniently removed from its container without including a portion of the liquid in which it is immersed. To further facilitate the removal of food from a liquid contained in relatively narrow and deep containers the spoon portion is not in alignment with the shank in the conventional manner, but rather is inclined away from the axis of the shank so that the food item may be received by the spoon without the necessity of inclining the container excessively. To additionally increase the usefulness of the utensil, the usual narrowed elliptical forward edge of a spoon is eliminated to present a blunt outer edge transverse to the axis of the shank, and a pair of tines are provided to extend outwardly from the blunt edge of the spoon to form a cradle with the spoon portion for receiving larger items of food such as olives, and also to provide means for piercing the food if desired. The tines may also be employed to maneuver tightly packed food for the purpose of positioning it to enable it to be pierced or scooped into the spoon portion or cradle of the utensil for lifting it from the jar.

The foregoing and other objects of the invention, which will become apparent from the following detailed specification setting forth an illustrative embodiment, may be achieved by the particular construction depicted in and described in connection with the accompanying drawings, in which:

Figure 1 is a perspective view of a utensil embodying the features of the present invention;

Figure 2 is a fragmentary ivew depicting the lower portion of the utensil illustrated in Figure 1, partly in side elevation and partly in vertical section to illustrate the particular configuration of the spoon portion;

Figure 3 is a fragmentary view in front elevation showing the lower portion of the utensil depicted in Figure 1; and Figure 4 is a perspective view with parts broken away illustrating the utensil shown in Figure 1 employed in removing an olive from the jar in which it is contained.

Reference is now made more particularly to the drawings wherein is shown a utensil embodying the various features of the present invention, and which comprises essentially a tapered handle 6 of elliptical cross section having a flattened area 7 formed at its outer end. A hole 8 is formed through the handle 6 at the flattened area 7, the latter being provided for the purpose of facilitating the insertion of a hook into the hole 8 for suspending the article therefrom for storage.

An elongated shank 12 is secured to the opposite end of the handle 6 to extend axially therefrom, and has a spoon portion 13 fixed to its extending end. The spoon portion 13 presents the usual concave surface but its position relative to the shank 12 differs from the usual spoon construction in that the spoon is not in approximate alignment with the shank 12 but is inclined substantially from the axis of the shank 12. The utensil is illustrated as being inclined approximately 45° from the axis of the shank 12 as a preferred embodiment but other angles of inclination may be employed and especially angles greater than 45°. Such positioning of the spoon portion 13 is provided for the specific purpose of facilitating the retention of food items in the concave surface of the spoon portion without requiring excessive tilting of the jar while the food is being removed therefrom.

Food items of the type that the utensil of the present invention is intended to be used with are usually packed in jars and immersed in a liquid. In order that the food may be removed from the jar with a minimum amount of the liquid, the spoon portion 13 is provided with openings 14 through which the liquid may drain while the food is retained on the spoon. The openings 14 are illustrated in the drawings as circular holes but it is to be understood that the openings may be of other configurations without impairing the efficiency of the utensil.

The spoon portion of the utensil comprising the present invention further departs from the conventional spoon construction in that the usual narrow rounded forward edge of a spoon is eliminated to present a blunt front edge 15 substantially transverse to the axis of the shank 12, with a tine 16 extending forwardly from each side of the front edge 15. The outer extremities of the tines 16 are further inclined upwardly a slight amount from the curvature of the spoon portion 13 to assist in retaining food items within a cradle formed by the two tines 16 and the spoon portion 13, and in which certain food items may be rested, as illustrated in Figure 4, to remove them from their container.

In some applications it may be more convenient to pierce the food to secure it to the utensil, and the tines 16 may be readily used for this purpose by simply forcing the point of the tines into the food item. In addition, the tines 16 serve the further function of maneuvering tightly packed food without piercing it for the purpose of loosening it from the pack and positioning it to facilitate scooping it into the spoon portion 13 or the cradle formed by the tines 16 with the spoon portion 13.

With this construction the utensil comprising the present invention may be employed in a variety of ways. For example, smaller food items, such as capers, may be placed upon the concave surface of the spoon portion 13 to remove them from their container, and the drainage openings 14 enable this to be accomplished without removing a portion of the liquid from the container with the capers. Furthermore, the inclined position of the spoon portion 13 relative to the shank 12 permits the food item to be manipulated into the spoon portion 13 without inclining the container an excessive amount to thereby avoid spilling the liquid from the container.

Another manner of use is illustrated in Figure 4, where the utensil is shown being utilized for removing an olive from a deep and narrow jar of the type in which olives are usually marketed. The olive is there shown cradled between the tines 16 and upon the spoon portion 13, so that it may be lifted from the jar without disturbing the liquid in which it is immersed. Since it is unnecessary to remove an excessive amount of liquid from the jar, the olives that are not immediately consumed will remain covered by the liquid in the jar and their quality will be preserved. Furthermore, removal of the olive from the jar in this manner does not in any way mar its appearance as would occur if it were pierced, and it will therefore appear more attractive when served. On the other hand, if it is found more desirable to remove the olive by piercing it for the purpose of attaching it to the utensil, the tines 16 may be conveniently used for this purpose without changing utensils.

Although the utensil is shown in Figure 4 employed for handling a medium size food item such as an olive, it is apparent that it can be just as readily used in the manner previously described for removing a much smaller food, such as capers, from its container. On the other hand, it may be just as conveniently employed for removing larger items of food from their containers, such as large pickles or the like, by resting the pickles upon the tines 16 or by utilizing the tines 16 for piercing the pickles to attach them to the utensil for removal from the jar.

From the foregoing detailed description of the construction and mode of operation of the illustrative embodiment of the present invention, it will be apparent that a new and improved utensil for removing food from containers has been provided, with the utensil being especially adapted for removing a large variety of foods from relatively deep containers with narrow openings.

Although the illustrative embodiment of the invention has been described in considerable detail for the purpose of making a full disclosure of a practical construction by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of embodying structure, we hereby claim as our invention:

1. In a food handling utensil, a handle, a spoon portion secured to said handle and presenting a concave surface with openings formed therein and having a blunt front edge, and a plurality of tines extending outwardly from said blunt front edge to form a cradle with said spoon portion, whereby the food being handled may be secured by piercing it with said tines, or by resting it either upon said spoon portion or within said cradle.

2. In a food handling utensil, a handle, a shank extending axially from said handle, a spoon portion secured to the end of said shank opposite the handle and presenting a concave surface with openings formed therein and having a blunt front edge, said spoon portion being inclined away from the axis of said handle, and a tine extending outwardly of said spoon portion from each end of said blunt front edge to form a cradle with the spoon portion, each of said tines following the path of curvature of said spoon portion with their extremities inclined upwardly therefrom, whereby the food being handled may be secured by piercing it with said tines, or by resting it either upon said spoon portion or within said cradle.

3. In a food handling utensil, a handle, a spoon portion secured to the end of said handle and presenting a concave surface with openings formed therein and having a blunt front edge, said spoon portion being inclined approximately 45° away from the axis of said handle, and a tine extending outwardly of said spoon portion from each end of said blunt front edge to form a cradle with the spoon portion, each of said tines following the path of curvature of said spoon portion with their extremities inclined upwardly therefrom, whereby the food being handled may be secured by piercing it with said tines, or by resting it either upon said spoon portion or within said cradle.

No references cited.